United States Patent
Ozaki

(10) Patent No.: US 10,404,011 B2
(45) Date of Patent: Sep. 3, 2019

(54) CONNECTION STRUCTURE OF PLATE SHAPED ROUTING MATERIAL AND ELECTRIC CONNECTION BOX

(71) Applicant: Yazaki Corporation, Minato-ku, Tokyo (JP)

(72) Inventor: Masahito Ozaki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 16/204,598

(22) Filed: Nov. 29, 2018

(65) Prior Publication Data

US 2019/0173228 A1 Jun. 6, 2019

(30) Foreign Application Priority Data

Dec. 1, 2017 (JP) .................. 2017-231808

(51) Int. Cl.
| | |
|---|---|
| *H02B 1/04* | (2006.01) |
| *H01R 13/631* | (2006.01) |
| *H01R 13/621* | (2006.01) |
| *H01R 13/03* | (2006.01) |

(52) U.S. Cl.
CPC .......... *H01R 13/631* (2013.01); *H01R 13/03* (2013.01); *H01R 13/621* (2013.01)

(58) Field of Classification Search
CPC .. H01R 23/726; H01R 13/111; H01R 2201/26

USPC ....................... 439/76.2, 682, 949
See application file for complete search history.

(56) References Cited

U.S. PATENT DOCUMENTS

| | | | |
|---|---|---|---|
| 6,935,790 B2* | 8/2005 | Ozaki .................. | G02B 6/3869 385/136 |
| 7,028,401 B2* | 4/2006 | Kawakita ............... | H01R 9/226 174/72 A |
| 2002/0151197 A1* | 10/2002 | Kawakita ............... | H01R 9/226 439/76.2 |
| 2019/0067839 A1* | 2/2019 | Ozaki ..................... | H01R 4/58 |

FOREIGN PATENT DOCUMENTS

JP 2006-203976 8/2006

* cited by examiner

*Primary Examiner* — Phuong Chi T Nguyen
(74) *Attorney, Agent, or Firm* — Banner & Witcoff, Ltd.

(57) ABSTRACT

A connection structure of a plate shaped routing material and an electric connection box, includes a plate shaped routing material, an electric connection box, and a connection mechanism. The plate shaped routing material includes a belt like flat shaped conductor in which an outer surface is covered with an insulating coating, a connecting cut-out part in which a part of an edge part in one long side part is removed in a rectangular shape, a conductor piece part exposed from the insulating coating in the connecting cut-out part, and a cut-out edge part.

6 Claims, 7 Drawing Sheets

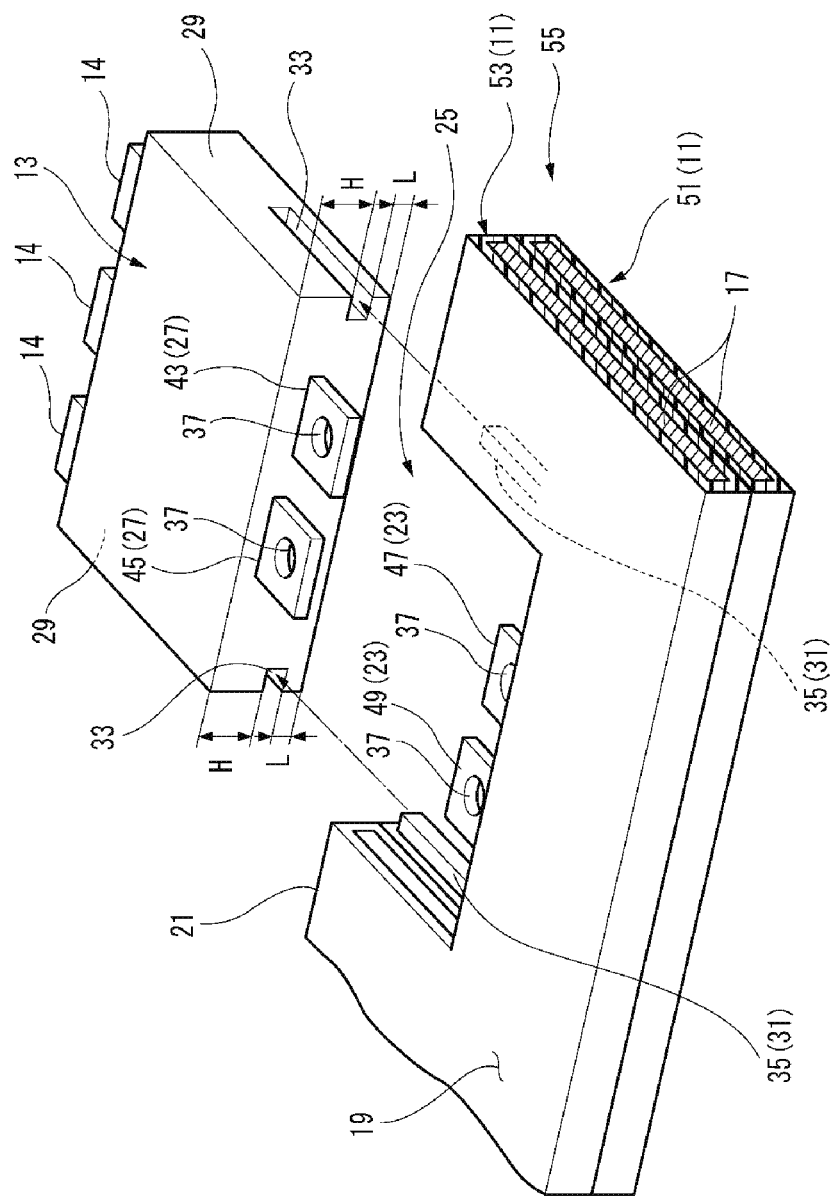

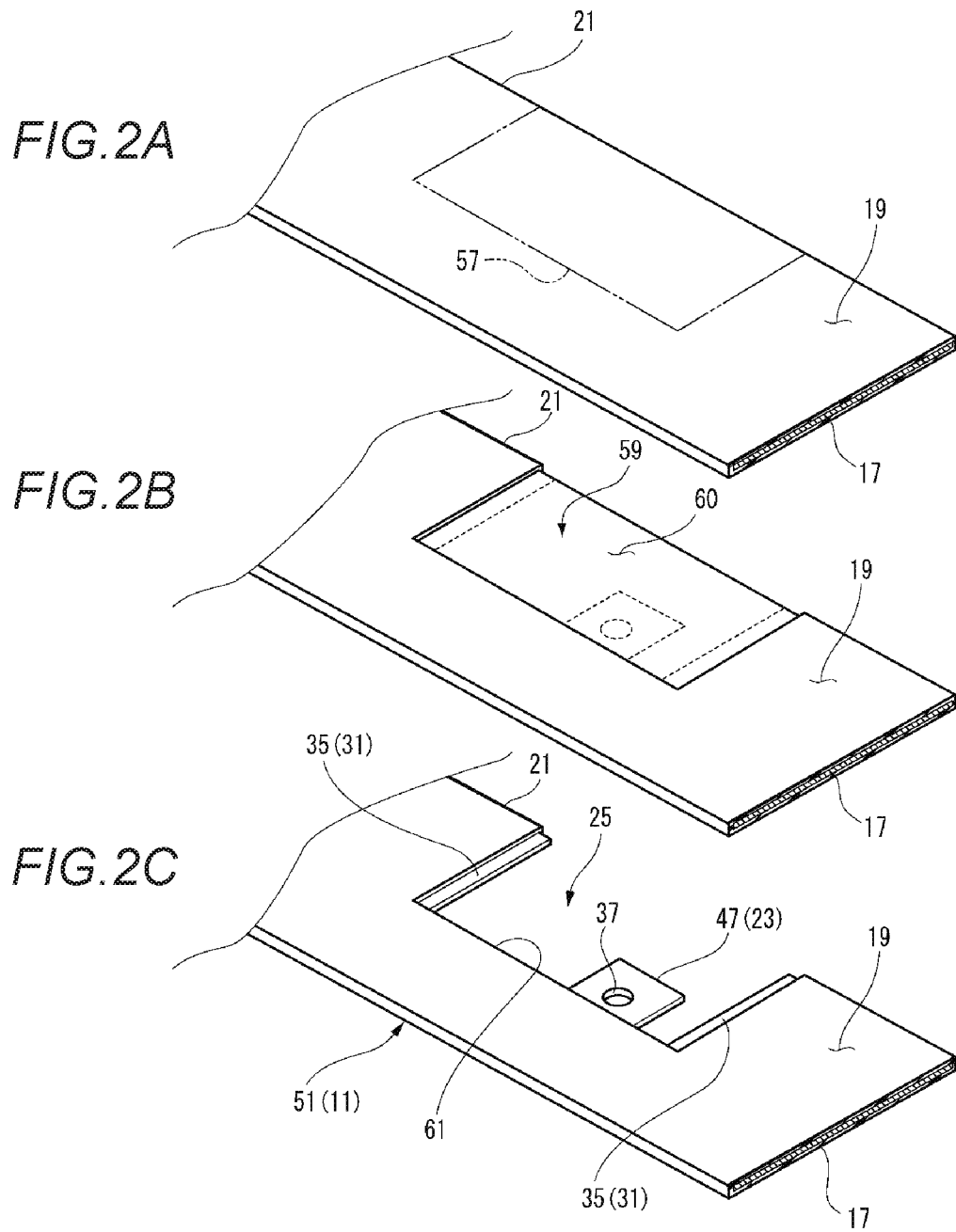

CONNECTION STRUCTURE OF PLATE SHAPED ROUTING MATERIAL AND ELECTRIC CONNECTION BOX

CROSS REFERENCE TO RELATED APPLICATIONS

This application claims priority from Japanese Patent Application No. 2017-231808 filed on Dec. 1, 2017, the entire contents of which are incorporated herein by reference.

BACKGROUND OF THE INVENTION

Field of the Invention

The present invention relates to a connection structure of a plate shaped routing material and an electric connection box.

Description of Related Art

An electric connection box (see Patent Literature 1: JP-A-2006-203976) is known which is mounted on a motor vehicle and has a circuit board accommodated in a case. In a connection structure of an electric wire using such kind of electric connection box, the electric connection box has a connector fitting part. A connector of a terminal of the electric wire drawn (branching) from a main line of a wire harness is connected to the connector fitting part of the electric connection box. Namely, to connect the main line of the wire harness to the electric connection box, the connectors are essentially necessary in both the members.
[Patent Literature 1] JP-A-2006-203976

According to a related art, in a usual connection of a main line of a wire harness and an electric connection box, since connectors formed with terminals or housings need to be prepared, a number of components and a cost are increased. Further, complicated works having a large number of processes need to be carried out in which a terminal is attached under pressure to the terminal of the electric wire of the main line of the wire harness and then, attached to the housing.

SUMMARY

One or more embodiments provides a connection structure of a plate shaped routing material and an electric connection box which can reduce the number of components and a cost without preparing connectors.

In an aspect (1), one or more embodiments provide a connection structure of a plate shaped routing material and an electric connection box including a plate shaped routing material, an electric connection box, and a connection mechanism. The plate shaped routing material includes a belt like flat shaped conductor in which an outer surface is covered with an insulating coating, a connecting cut-out part in which a part of an edge part in one long side part is removed in a rectangular shape, a conductor piece part exposed from the insulating coating in the connecting cut-out part, and a cut-out edge part. The electric connection box includes a mate side conductor piece part electrically connectable to the conductor piece part, a side wall along an inserting direction into the connecting cut-out part, and a guide groove formed on the side wall in which the cut-out edge part is configured to be inserted. The electric connection box is configured to be inserted into the connecting cut-out part. The connection mechanism electrically conducts and connects the conductor piece part to the mate side conductor piece part.

According to the aspect (1), in the plate shaped routing material, a connecting cut-out part is formed in which a conductor piece part is remained and an edge part is partly removed in a rectangular shape. Namely, in the plate shaped routing material, the conductor piece part which can be directly and electrically connectable to a conductor piece part of a mate side by forming the connecting cut-out part is cut out and formed from a flat shaped conductor. The conductor piece part can be easily formed by, for instance, press working or forming the flat shaped conductor. The electric connection box having the mate side conductor piece part electrically connectable to the conductor piece part is inserted into the connecting cut-out part of the plate shaped routing material. At that time, since cut-out edge parts of the connecting cut-out part move into guide grooves of side walls, the electric connection box can be positioned and temporarily fixed. Thus, a connection work of the conductor piece part and the mate side conductor piece part in a connection mechanism by a fastening member or a welding can be easily carried out. Accordingly, in the connection structure of the plate shaped routing material and the electric connection box having the present structure, the connectors formed with the terminals or the housings do not need to be prepared and the number of components and a cost can be reduced the more than the usual connection structure of the main line of the wire harness and the electric connection box. Further, complicated works having a large number of processes in which the terminal is attached under pressure to the terminal of the electric wire or the terminal is attached to the housing are also unnecessary.

In an aspect (2), the cut-out edge part is a conductor cut-out edge part in which the insulating coating is removed.

According to the aspect (2), the cut-out edge part inserted into the guide groove is a conductor cut-out edge part in which an insulating coating is removed. The flat shaped conductor is formed with a metal plate made of, for instance, aluminum or aluminum alloy, copper or copper alloy. Namely, since an edge of the metal plate is directly inserted into the guide groove, the conductor cut-out edge part can be inserted into the guide groove more smoothly and a connection working property of the electric connection box to the plate shaped routing material is more effective than a case that the cut-out edge part is inserted into the guide groove together with the insulating coating made of a soft resin.

In an aspect (3), the electric connection box includes a plurality of the mate side conductor piece parts separated from each other and adjacently arranged. A plurality of the plate shaped routing materials are laminated so that a plurality of the conductor piece parts are separated from each other and adjacently arranged.

According to the aspect (3), since a plurality of connection mechanisms can be adjacently arranged substantially at the same positions of laminated plate shaped routing materials, a connection work can be easily carried out. Further, a plurality of circuits can be connected by ensuring a small dimension in a direction of lamination without a change of the dimension of the plate shaped routing material in a direction of width. Further, since a plurality of plate shaped routing materials in which the conductor piece parts are previously formed at prescribed positions are used, the plurality of conductor piece parts can be arranged at the prescribed positions only by laminating the plate shaped routing materials. Then, since the conductor piece parts which can be directly connected can be simply formed, a usual complicated assembly process of the wire harness is not necessary that a plurality of electric wires are bundled and connectors are attached to prescribed positions respectively for circuits.

In an aspect (4), a pair of the guide grooves are respectively formed on a pair of the side walls which are parallel along the inserting direction in the electric connection box. A pair of the conductor cut-out edge parts in any one of a plurality of the plate shaped routing materials which are laminated, are configured to be respectively inserted into the the pair of the guide grooves.

According to the aspect (4), since the conductor cut-out edge parts may be formed only in one plate shaped routing material of the plurality of laminated plate shaped routing materials, other plate shaped routing materials can be easily worked. Further, since a pair of conductor cut-out edge parts are respectively inserted into a pair of guide grooves formed on side walls in both sides of the electric connection box, the electric connection box can be more assuredly positioned and temporarily fixed.

In an aspect (5), a pair of the guide grooves are respectively formed on a pair of the side walls which are parallel along the inserting direction in the electric connection box. A plurality of the conductor cut-out edge parts of two different plate shaped routing materials of a plurality of the plate shaped routing materials which are laminated, are configured to be respectively inserted into the pair of the guide grooves.

According to the aspect (5), with a structure in which a pair of conductor cut-out edge parts are necessary, one conductor cut-out edge part may be provided in one plate shaped routing material. In two plate shaped routing materials laminated in two layers, if the a pair of conductor cut-out edge parts are provided in one plate shaped routing material, either one of the conductor cut-out edge parts is arranged near the conductor piece part in the other layer. It is not preferable from the viewpoint of short-circuit to arrange the conductor cut-out edge part near the conductor piece part in the other layer. Thus, in the different two plate shaped routing materials, when the conductor piece part only in one side of the a pair of conductor piece parts is provided, a structure can be formed in which the conductor cut-out edge part is not arranged near the conductor piece part of the other layer.

In an aspect (6), the two different plate shaped routing materials including the plurality of the conductor cut-out edge parts are laminated so that the plurality of the conductor cut-out piece parts are adjacent to the plurality of the conductor piece parts.

According to the aspect (6), the conductor piece parts are formed adjacently to the conductor cut-out edge parts inserted into the guide grooves. Here, in the same plate shaped routing material, the conductor cut-out edge parts and the conductor piece parts are cut out from the same flat shaped conductor. Thus, if a slip is generated in a longitudinal direction when the plurality of plate shaped routing materials are laminated, there is no fear that an insulating distance between the adjacent conductor cut-out edge part and the conductor piece part is reduced to generate short-circuit. Namely, the conductor piece part can be arranged without allowing the conductor piece part to come near to the conductor cut-out edge part in the other layer.

ADVANTAGE OF THE INVENTION

According to one or more embodiments, the connector does not need to be prepared and the number of components and a cost can be reduced.

The present invention is briefly described above. Further, when a mode for carrying out the invention which will be described below is read by referring to the attached drawings, a detail of the present invention will be more clarified.

BRIEF DESCRIPTION OF THE DRAWINGS

FIG. 1 is an exploded perspective view showing a connection structure of a plate shaped routing material and an electric connection box according to a first exemplary embodiment.

FIGS. 2A to 2C are a process chart showing processes in which a first conductor piece part and conductor cut-out edge parts are formed in a first plate shaped routing material shown in FIG. 1.

DETAILED DESCRIPTION

Figure 3A:
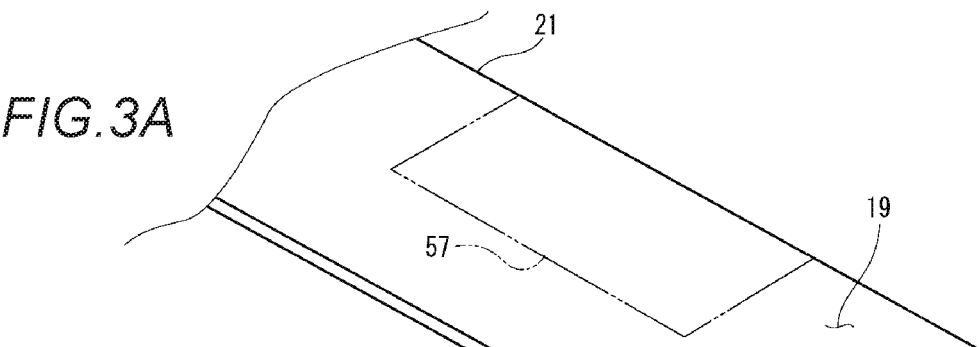
FIGS. 3A to 3C are a process chart showing processes in which a second conductor piece part is formed in a second plate shaped routing material shown in FIG. 1

Now, exemplary embodiments according to the present invention will be described below by referring to the drawings.

First Exemplary Embodiment

FIG. 1 is an exploded perspective view showing a connection structure of a plate shaped routing material 11 and an electric connection box 13 according to a first exemplary embodiment of the present invention.

The connection structure of the plate shaped routing material 11 and the electric connection box 13 includes the plate shaped routing material 11, the electric connection box 13 and a connection mechanism 15 as main components.

The plate shaped routing material 11 has a belt like flat shaped conductor 17. The flat shaped conductor 17 has an outer peripheral surface covered with an insulating coating 19. For the flat shaped conductor 17, electrically conductive metal such as aluminum or aluminum alloy, or copper or copper alloy is preferably suitably used. The flat shaped conductor 17 is formed to be thin and has a rectangular shape in section intersecting at right angles to a longitudinal direction. In this case, the outer peripheral surface of the flat shaped conductor 17 is an outer peripheral surface in which upper and lower surfaces and left and right side surfaces excluding both end faces in the longitudinal direction are continuous. In the plate shaped routing material 11, a direction intersecting at right angles to the longitudinal direction is designated as a direction of width and a direction of lamination is designated as a direction of thickness. In the plate shaped routing material 11, a dimension of width is formed to be extremely larger than a dimension of thickness.

As the insulating coating 19, an arbitrary insulating material which electrically insulates the flat shaped conductor 17 of the plate shaped routing material 11 may be used. The insulating coating 19 can be formed by, for instance, a powder coating on the outer peripheral surface of the flat shaped conductor 17. The powder coating mainly includes two kinds of an "electrostatic coating method (a spray coating)" and a "fluid dipping method (a dip coating)". The insulating coating 19 may be formed by any of the powder coating methods. A plurality of plate shaped routing materials 11 are laminated after the insulating coating 19 is formed by the powder coating.

Further, in one long side part 21 of the plate shaped routing material 11, a conductor piece part 23 is formed, whose extending end is continuously exposed from the insulating coating 19 as a part of the plate shaped conductor 17. The conductor piece part 23 is formed within a range in the direction of width in the one long side part 21.

The plate shaped routing material 11 has a part in which the conductor piece part 23 is formed as a connecting cut-out part 25. The connecting cut-out part 25 is formed substantially in the shape of E in which the conductor piece part 23 exposed from the insulating coating 19 is left and a part of an edge part is removed in a rectangular shape in the one long side part 21.

The electric connection box 13 includes a mate side conductor piece part 27 electrically connectable to the conductor piece part 23 and a plurality of connector parts 14 to which branch connectors not shown in the drawing are connected. The electric connection box 13 is inserted into the connecting cut-out part 25 of the plate shaped routing material 11. In side walls 29 along an inserting direction in the electric connection box 13, guide grooves 33 are formed into which cut-out edge parts 31 along the inserting direction in the connecting cut-out part 25 are inserted. In the present exemplary embodiment, a pair of guide grooves 33 are arranged in a lower surface side of both the side walls 29 in the electric connection box 13. Namely, the pair of guide grooves 33 are formed in such a way that a distance from the lower surface is L, and a distance from an upper surface is H (L<H).

The cut-out edge parts 31 are right and left edges which sandwich the conductor piece part 23 between them in the connecting cut-out part 25 formed substantially in the shape of E with the conductor piece part 23 left in a central position.

In the first exemplary embodiment, the cut-out edge parts 31 are conductor cut-out edge parts 35 formed by removing the insulating coating 19. The cut-out edge part 31 is a general term of the conductor cut-out edge part 35.

The connection mechanism 15 electrically conducts and connects the conductor piece part 23 to the mate side conductor piece part 27. The connection mechanism 15 may be formed by, for instance, a bolt hole 37, a bolt 39 (see FIG. 5) and a nut 41 (see FIG. 5).

In the first exemplary embodiment, the electric connection box 13 includes a plurality of mate side conductor piece parts 27 (a first mate side conductor piece part 43 and a second mate side conductor piece part 45) which are arranged so as to be separated from and near to each other.

In accordance therewith, a plurality of plate shaped routing materials 11 (a first plate shaped routing material 51 and a second plate shaped routing material 53) are laminated in such a manner that a plurality of conductor piece parts 23 in the plate shaped routing material 11 (a first conductor piece part 47 and a second conductor piece part 49) are arranged so as to be separated from and near to each other.

As described above, the plurality of plate shaped routing materials 11 can be laminated. The plurality of plate shaped routing materials 11 are laminated through the insulating coating 19, so that a laminated routing body 55 is formed that has a plurality of independent circuits according to the number of laminations. The number of laminations of the plate shaped routing materials 11 is not especially limited. Namely, the laminated routing body 55 may have not only two layers as shown in the drawing, but also three layers or four layers. In the first exemplary embodiment, the first plate shaped routing material 51 and the second plate shaped routing material 53 are laminated from a lower layer to form the laminated routing body 55 having the two layers. The above-described plate shaped routing material 11 is a general term of the first plate shaped routing material 51 and the second plate shaped routing material 53.

In the laminated routing body 55, a plurality of laminated plate shaped routing materials 11 may be formed as, for instance, two circuits, three circuit and four circuits. In the two circuits of the present structure example, a lower layer may be formed as a ground circuit and an upper layer may be formed as a power supply circuit. In the case of the three circuits, a lower layer may be formed as a power supply circuit, an intermediate circuit may be formed as a ground circuit and an upper circuit may be formed as a signal circuit.

When the laminated routing body 55 has the four circuits, for instance, the circuits may respectively have a negative of 48V, a positive of 48V, a positive of 12V and a negative of 12V in order from the lower layer. As in this lamination example, the plate shaped routing material 11 of the second layer and the plate shaped routing material 11 of the third layer which are adjacent to each other preferably have the same poles. Namely, the plate shaped routing material 11 of the second layer is set to have the "positive of 48V" and the plate shaped routing material 11 of the third layer is set to have the "positive of 12V". In the laminated routing body 55 having many circuits laminated, since the same poles are arranged to be adjacent in such a way as described above, for instance, a crosstalk that noise of a power type layer is transmitted to a signal type layer can be suppressed and a noise-proof performance can be improved.

In the first exemplary embodiment, in the pair of parallel side walls 29 respectively along the inserting direction in the electric connection box 13, the pair of guide grooves 33 are formed. Into the a pair of guide grooves 33, the a pair of conductor cut-out edge parts 35 in any one plate shaped routing material 11 of the plurality of laminated plate shaped routing materials 11 are inserted.

FIGS. 2A to 2C are a process chart showing processes in which the first conductor piece part 47 and the conductor cut-out edge parts 35 are formed in the first plate shaped routing material 51 shown in FIG. 1.

In a coating process of the insulating coating 19 of the first plate shaped routing material 51, a masking work is applied to the one long side part 21 of the plate shaped conductor 17 in which the first conductor piece part 47 and the conductor cut-out edge parts 35 are formed. The masking work can be carried out by using a rectangular viscous sheet material 57 which sandwiches an edge part of the one long side part 21 from front and back surfaces as shown in FIG. 2A.

After the coating process is finished, the viscous sheet material 57 is removed. As shown in FIG. 2B, in the edge part of the one long side part 21, a rectangular conductor showing part 59 is formed. The flat shaped conductor 17 in the conductor showing part 59 is blanked or stamped by a desired die, for instance, in a press working, and the first conductor piece part 47 and the conductor cut-out edge parts 35 are formed as shown in FIG. 2C. Namely, a part 60 of the edge part in the one long side part 21 of the plate shaped routing material 11 is removed to a prescribed form, so that the conductor showing part 59 becomes the first conductor piece part 47 and the conductor cut-out edge parts 35. At that time, in the first conductor piece part 47, the bolt hole 37 may be bored into which a fastening member as the connection mechanism 15 is inserted at the same time.

Figure 3B:
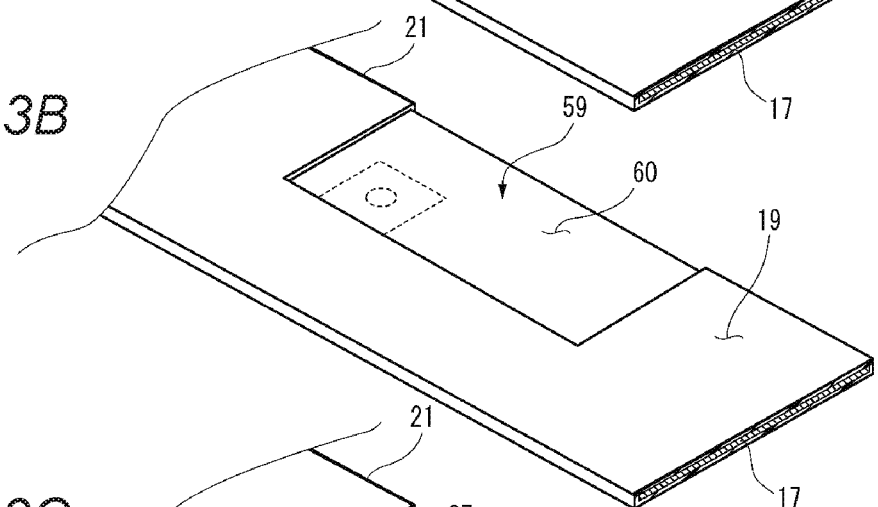
Figure 3C:
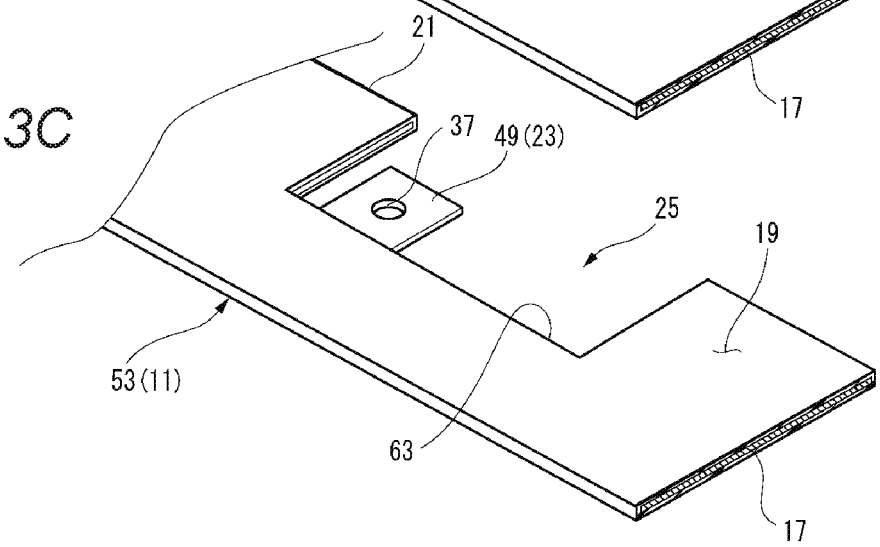

FIGS. 3A to 3C are a process chart showing processes in which the second conductor piece part 49 is formed in the second plate shaped routing material 53 shown in FIG. 1.

In the second plate shaped routing material 53, the second conductor piece part 49 is formed by the same processes shown in FIGS. 3A to 3C as those in the above-described first plate shaped routing material 51 except that the conductor cut-out edge parts 35 are not formed and only the second conductor piece part 49 is formed.

Figure 4:
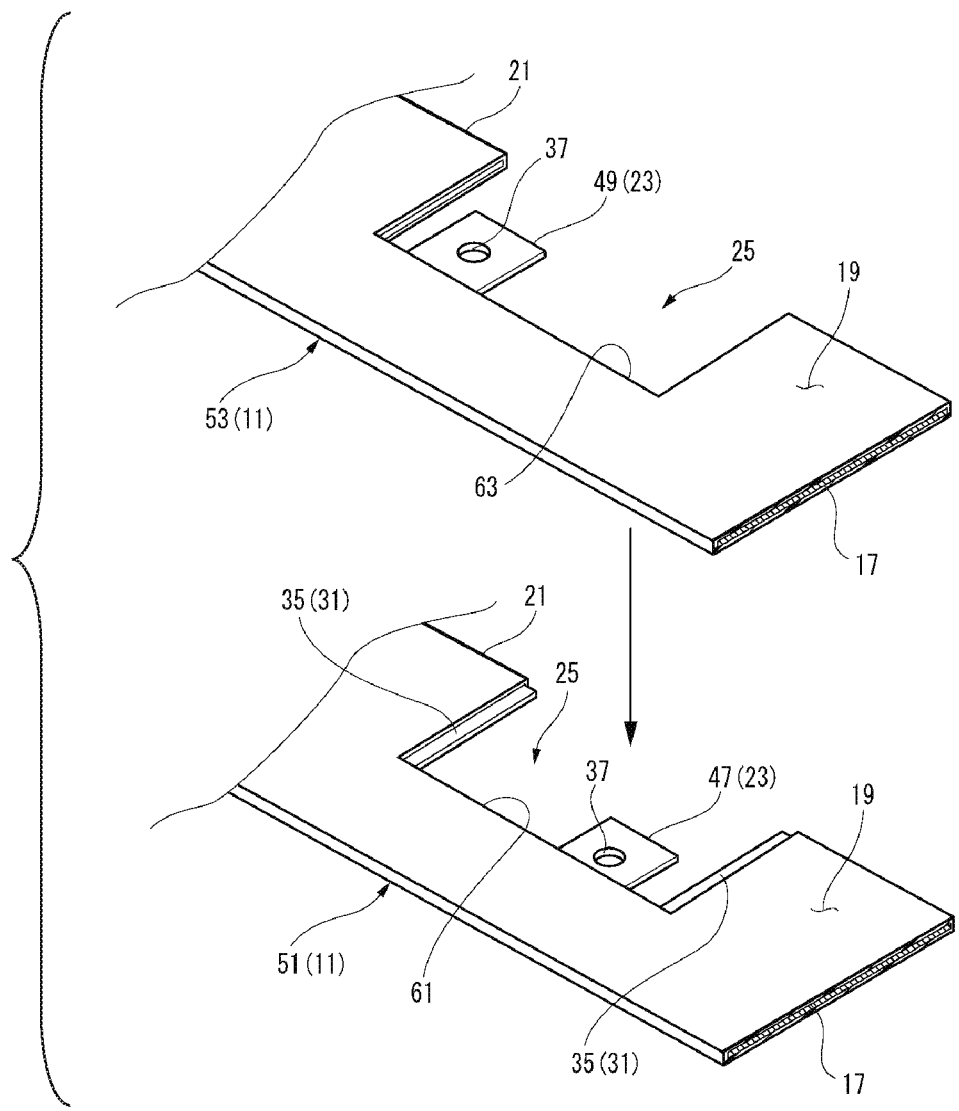
FIG. 4 is an exploded perspective views of the first plate shaped routing material and the second plate shaped routing material shown in FIG. 1.

FIG. 4 is an exploded perspective views of the first plate shaped routing material 51 and the second plate shaped routing material 53 shown in FIG. 1.

In the first plate shaped routing material 51 and the second plate shaped routing material 53, a part 60 of the edge part in the one long side part 21 of the plate shaped material 11 is removed substantially in the shape of E to form the first conductor piece part 47 and the second conductor piece part 49. The connecting cut-out part 25 having the shape of E in the first plate shaped routing material 51 has an outline part as a first recessed part 61. The connecting cut-out part 25 having the shape of E in the second plate shaped routing material 53 has an outline part as a second recessed part 63.

In the first plate shaped routing material 51, the first conductor piece part 47 protrudes from a bottom of the first recessed part 61 and a pair of conductor cut-out edge parts 35 are formed so as to sandwich the first conductor piece part 47 between them. Further, in the second plate shaped routing material 53, the second conductor piece part 49 protrudes from a bottom of the second recessed part 63 and the conductor cut-out edge parts 35 are not formed in the second plate shaped routing material 53. The first conductor piece part 47 of the first plate shaped routing material 51 and the second conductor piece part 49 of the second plate shaped routing material 53 are formed in different positions (positions shift in the longitudinal direction of the long side part 21) in the recessed outline forms of the first recessed part 61 and the second recessed part 63 which are mutually superposed.

In the laminated routing body 55, the first plate shaped routing material 51 and the second plate shaped routing material 53 are laminated in such a way that the first recessed part 61 corresponds to the second recessed part 63. As a result, as shown in FIG. 1, the first conductor piece part 47 and the second conductor piece part 49 are arranged in the different positions in the longitudinal direction in the connecting cut-out part 25 of the laminated routing body 55.

Figure 5:
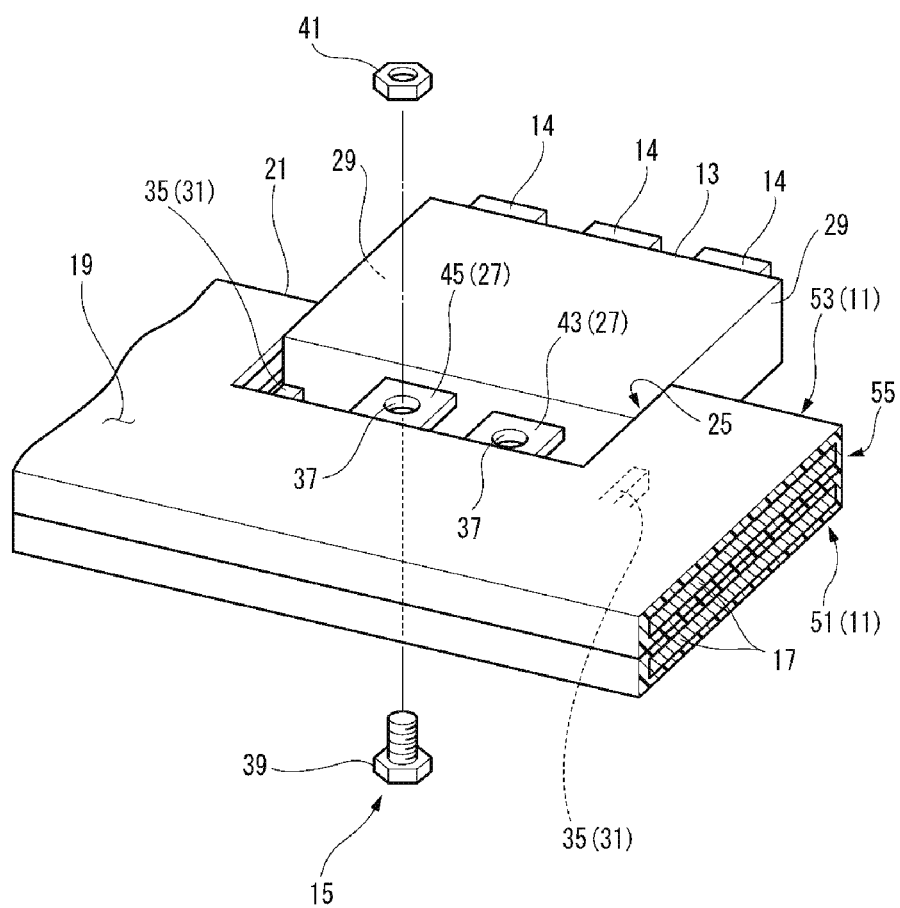
FIG. 5 is an exploded perspective view showing one example of a connection mechanism applied to the connection structure shown in FIG. 1.

FIG. 5 is an exploded perspective view showing one example of the connection mechanism 15 applied to the connection structure shown in FIG. 1.

To the first conductor piece part 47 and the second conductor piece part 49 of the laminated routing body 55, the first mate side conductor piece part 43 and the second mate side conductor piece part 45 of the electric connection box 13 are connected. At the time of the connection, into the a pair of guide grooves 33 of the electric connection box 13, the a pair of conductor cut-out edge parts 35 in the connecting cut-out part 25 are inserted.

In the first mate side conductor piece part 43 and the second mate side conductor piece part 45, the same bolt holes 37 as those of the first conductor piece part 47 and the second conductor piece part 49 are bored. When moving ends of the conductor cut-out edge parts 35 abut on interior walls of the guide grooves 33, the electric connection box 13 is positioned and temporarily fixed to a prescribed position of the connecting cut-out part 25. In the temporarily fixed position, the bolt holes 37 of the first mate side conductor piece part 43 and the second mate side conductor piece part 45 correspond to the bolt holes 37 of the first conductor piece part 47 and the second conductor piece part 49 as shown in FIG. 5.

The electric connection box 13 is completely formally fixed to the connecting cut-out part 25 of the laminated routing body 55 by fastening the bolt holes 37 respectively by the bolts 39 and the nuts 41 of the connection mechanism 15. In the electric connection box 13 which is completely connected to the laminated routing body 55, branch connectors of electric wires of, for instance, an auxiliary device side are connected to prescribed connector parts 14.

Now, an operation of the above-described structure will be described below.

In the connection structure of the plate shaped routing material and the electric connection box according to the first exemplary embodiment, in the plate shaped routing material 11, the connecting cut-out part 25 having the shape of E is formed in which the conductor piece part 23 is left and the edge part is partly removed in a rectangular shape. Namely, in the plate shaped routing material 11, the conductor piece part 23 can be directly and electrically connectable to the conductor piece part 27 of the mate side by forming the connecting cut-out part 25.

The conductor piece part 23 can be easily formed by, for instance, press working or forming the flat shaped conductor 17. The electric connection box 13 having the mate side conductor piece part 27 electrically connectable to the conductor piece part 23 is inserted into the connecting cut-out part 25 of the plate shaped routing material 11. At that time, since the cut-out edge parts 31 of the connecting cut-out part 25 move into the guide grooves 33 of the side walls 29, the electric connection box 13 can be positioned and temporarily fixed. Thus, a connection work of the conductor piece part 23 and the mate side conductor piece part 27 by the connection mechanism 15 can be easily carried out.

Accordingly, in the connection structure of the plate shaped routing material and the electric connection box according to the first exemplary embodiment, the connectors formed with the terminals or the housings do not need to be prepared and the number of components and a cost can be reduced the more than the usual connection structure of the main line of the wire harness and the electric connection box.

Further, complicated works having a large number of processes in which the terminal is attached under pressure to the terminal of the electric wire or the terminal is attached to the housing are also unnecessary.

Further, in the connection structure of the plate shaped routing material and the electric connection box according to the first exemplary embodiment, the cut-out edge parts 31 inserted into the guide grooves 33 are the conductor cut-out edge parts 35 in which the insulating coating 19 is removed. The flat shaped conductor 17 is formed with a metal plate made of, for instance, aluminum or aluminum alloy, copper or copper alloy. Namely, since the edges of the metal plate are directly inserted into the guide grooves 33, the conductor cut-out edge parts 35 can be inserted into the guide grooves 33 more smoothly and a connection working property of the electric connection box 13 to the plate shaped routing material 11 is more effective than a case that the cut-out edge parts are inserted into the guide grooves together with the insulating coating 19 made of a soft resin.

In the connection structure of the plate shaped routing material and the electric connection box according to the first exemplary embodiment, since the plurality of connection mechanisms 15 can be adjacently arranged substantially at the same positions of the laminated plate shaped routing materials 11, a connection work can be easily carried out. Further, the plurality of circuits can be connected by ensuring a small dimension in a direction of lamination without a change of the dimension of the plate shaped routing material 11 in a direction of width. Further, since the plurality of plate shaped routing materials 11 in which the conductor piece parts 23 are previously formed at prescribed positions are used, the plurality of conductor piece parts 23 can be arranged at the prescribed positions only by laminating the plate shaped routing materials 11. Then, since the conductor piece parts which can be directly connected can be simply formed, a usual complicated assembly process of the wire harness is not necessary that a plurality of electric wires are bundled and connectors are attached to prescribed positions respectively for circuits.

Further, in the connection structure of the plate shaped routing material and the electric connection box according to the first exemplary embodiment, since the a pair of conductor cut-out edge parts 35 may be formed only in one plate shaped routing material 11 of the plurality of laminated plate shaped routing materials 11, other plate shaped routing materials 11 can be easily worked. Further, since a pair of conductor cut-out edge parts 35 are respectively inserted into a pair of guide grooves 33 formed on the side walls 29 in both sides of the electric connection box 13, the electric connection box 13 can be more assuredly positioned and temporarily fixed.

Second Exemplary Embodiment

Now, a second exemplary embodiment will be described below.

Figure 6:
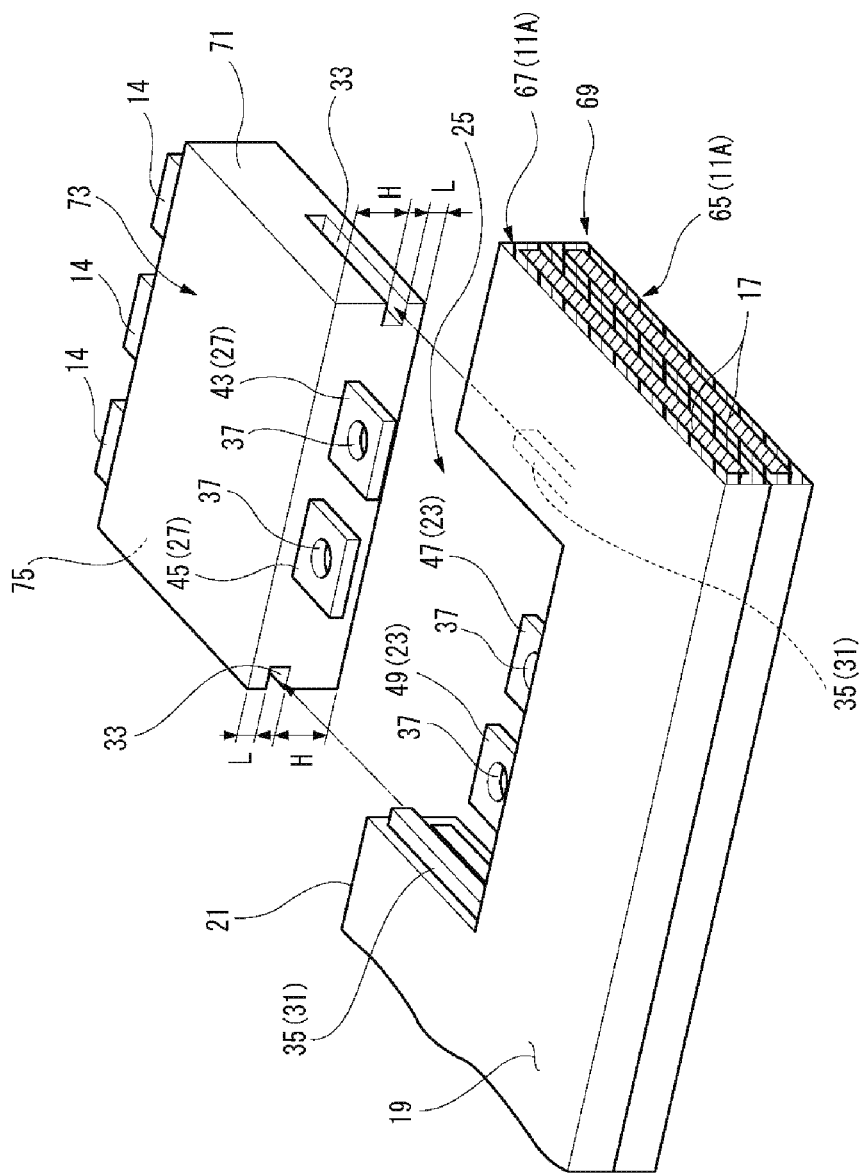
FIG. 6 is an exploded perspective view showing a connection structure of a plate shaped routing material and an electric connection box according to a second exemplary embodiment of the present invention.

FIG. 6 is an exploded perspective view showing a connection structure of a plate shaped routing material 11A and an electric connection box 73 according to a second exemplary embodiment of the present invention. In the second exemplary embodiment, the same structures as those described in the first exemplary embodiment are designated by the same reference numerals and a duplicated explanation is omitted.

In the connection structure of the plate shaped routing material 11A and the electric connection box 73 according to the second exemplary embodiment, in one sides of connecting cut-out parts 25 in the two different plate shaped routing materials 11A of a plurality of laminated plate shaped routing materials 11A (a first plate shaped routing material 65 and a second plate shaped routing material 67), conductor cut-out edge parts 35 are respectively formed. The first plate shaped routing material 65 and the second plate shaped routing material 67 form a laminated routing body 69 having a plurality of independent circuits.

Figure 7:
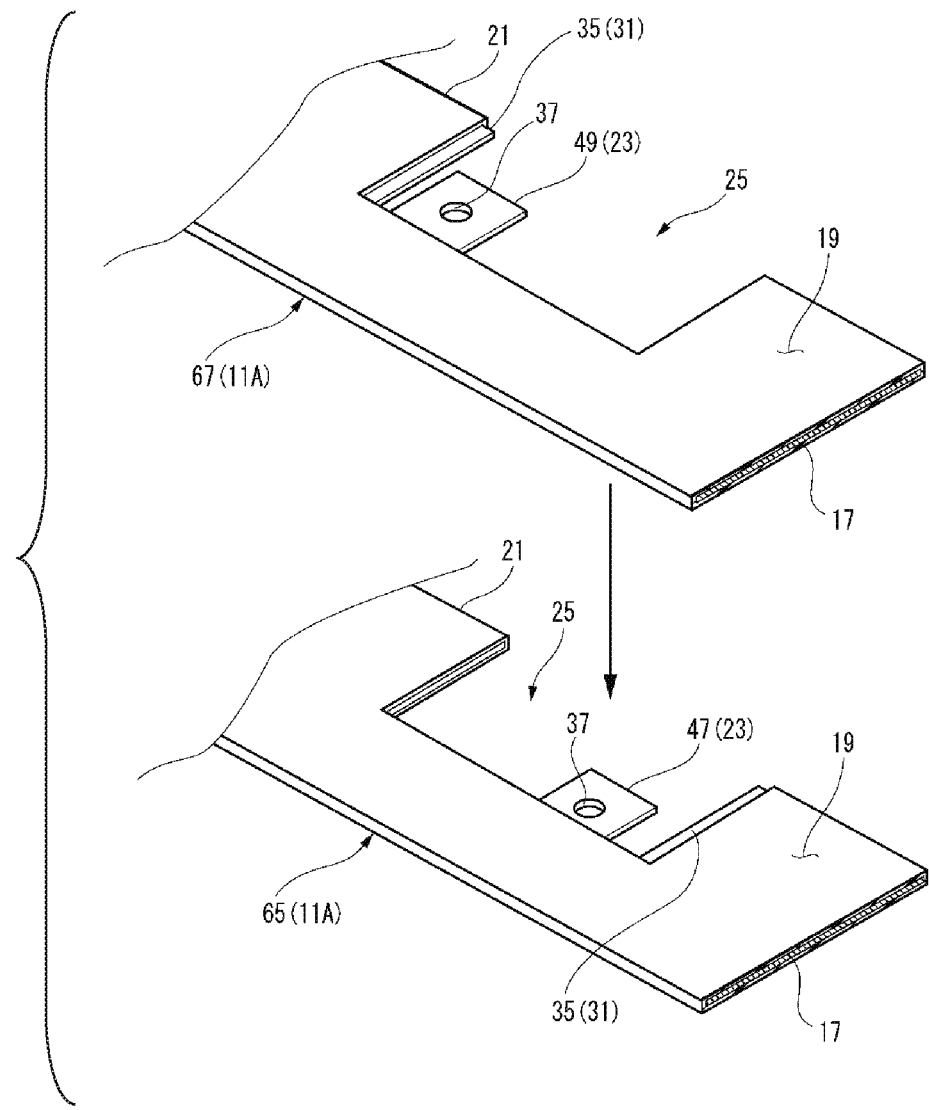
FIG. 7 is an exploded perspective views of the first plate shaped routing material and the second plate shaped routing material shown in FIG. 6.

FIG. 7 is an exploded perspective views of the first plate shaped routing material 65 and the second plate shaped routing material 67 shown in FIG. 6.

Namely, in a pair of conductor cut-out edge parts 35, the one conductor cut-out edge part 35 is provided in the connecting cut-out part 25 of the first plate shaped routing material 65. The other conductor cut-out edge part 35 is provided in the connecting cut-out part 25 of the second plate shaped routing material 67. Here, in the first pate shaped routing material 65 and the second plate shaped routing material 67 having the conductor cut-out edge parts 35 which move into guide grooves 33, a first conductor piece part 47 and a second conductor piece part 49 thereof are respectively formed adjacently to the conductor cut-out edge parts 35 which are inserted into the guide grooves 33.

In the second exemplary embodiment, one of the a pair of guide grooves 33 is arranged in a lower surface side of the electric connection box 73 in one side wall 71 (a right side in FIG. 6). The other guide groove 33 is arranged in an upper surface side of the electric connection box 73 in the other side wall 75 (a left side in FIG. 6). Namely, the guide groove 33 is formed in the one side wall 71 in such a way that a distance from the lower surface is L and a distance from the upper surface is H (L<H). Further, the guide groove 33 is formed in the other side wall 75 in such away that a distance from the lower surface is H and a distance from the upper surface is L.

In the connection structure of the plate shaped routing material 11A and the electric connection box 73 according to the second exemplary embodiment, with a structure in which a pair of conductor cut-out edge parts 35 are necessary, one conductor cut-out edge part 35 may be provided in the one plate shaped routing material 11A. In the two plate shaped routing materials 11A (the first plate shaped routing material 65 and the second plate shaped routing material 67) laminated in two layers, if the a pair of conductor cut-out edge parts 35 are provided in the one plate shaped routing material 11A, either one of the conductor cut-out edge parts 35 is arranged near the conductor piece part 23 in the other layer. It is not preferable from the viewpoint of short-circuit to arrange the conductor cut-out edge part 35 near the conductor piece part 23 in the other layer. Thus, in the different two plate shaped routing materials 11A, when the conductor piece part only in one side of the a pair of conductor piece parts 23 is provided, a structure can be formed in which the conductor cut-out edge part 35 is not arranged near the conductor piece part 23 of the other layer.

According to the connection structure of the plate shaped routing material and the electric connection box according to the second exemplary embodiment, the first conductor piece part 47 and the second conductor piece part 49 are respectively formed adjacently to the conductor cut-out edge parts 35 inserted into the guide grooves 33 as shown in FIG. 7. Here, in the same plate shaped routing material 11A, the conductor cut-out edge part 35 and the conductor piece part 23 are cut out from the same flat shaped conductor 17. Thus, if a slip is generated in a longitudinal direction when the two plate shaped routing materials 11A are laminated, there is no fear that an insulating distance between the adjacent conductor cut-out edge part 35 and the conductor piece part 23 is reduced to generate short-circuit.

As described above, according to the connection structure of the plate shaped routing material and the electric connection box of the second exemplary embodiment, the first conductor piece part 47 and the second conductor piece part 49 can be arranged not so as to come near the conductor cut-out edge part 35 in the other layer. An insulating distance between the conductor cut-out edge part 35 and the conductor piece part 23 in the other layer can be ensured to be large.

Accordingly, in the connection structure of the plate shaped routing material and the electric connection box according to the above-described exemplary embodiments respectively, the connectors do not need to be prepared and the number of components and a cost can be reduced.

The present invention is not limited to the above-described exemplary embodiments, and it is to be anticipated by the present invention and included within a range to be protected that the structures of the exemplary embodiments are combined mutually or a person with an ordinary skill in the art makes a change or an application in accordance with the description of the specification and a well-known technique.

For instance, as the connection mechanism which electrically conducts and connects the conductor piece part 23 to the mate side conductor piece part 27, an example is described that they are connected together by the bolt 39 and the nut 41. However, the conductor piece part 23 may be connected to the mate side conductor piece part 27 by welding as the connection mechanism. In this case, since the conductor cut-out edge parts 35 are inserted into the guide grooves 33 to position and temporarily fix the electric connection box 13 (73), a welding operation can be easily carried out. Further, in the above-described exemplary embodiments, the conductor cut-out edge parts 35 with the insulating coating 19 removed are inserted into the guide grooves 33, however, the cut-out edge parts 31 whose insulating coating 19 is not removed may be inserted into the guide grooves 33.

Here, features of the exemplary embodiments of the connection structure of the plate shaped routing material and the electric connection box according to the present invention are respectively and briefly summarized and described below.

[1] A connection structure of a plate shaped routing material and an electric connection box, the connection structure comprising:
  a plate shaped routing material (11, 11A),
  an electric connection box (13, 73), and
  a connection mechanism (15),
  wherein the plate shaped routing material (11, 11A) includes a belt like flat shaped conductor (17) in which an outer surface is covered with an insulating coating (19), a connecting cut-out part (25) in which a part (60) of an edge part in one long side part (21) is removed in a rectangular shape, a conductor piece part (23) exposed from the insulating coating (19) in the connecting cut-out part (25), and a cut-out edge part (31),
  wherein the electric connection box (13, 73) includes a mate side conductor piece part (27) electrically connectable to the conductor piece part (23), a side wall (29, 71, 75) along an inserting direction into the connecting cut-out part (25), and a guide groove (33) formed on the side wall (29, 71, 75) in which the cut-out edge part (31) is configured to be inserted,
  wherein the electric connection box (13, 73) is configured to be inserted into the connecting cut-out part (25), and
  wherein the connection mechanism (15) electrically conducts and connects the conductor piece part (23) to the mate side conductor piece part (27).

[2] The connection structure of the plate shaped routing material and the electric connection box according to the above-described [1],
  wherein the cut-out edge part (31) is a conductor cut-out edge part (35) in which the insulating coating (19) is removed.

[3] The connection structure of the plate shaped routing material and the electric connection box according to the above-described [2],
  wherein the electric connection box (13, 73) includes a plurality of the mate side conductor piece parts (27) separated from each other and adjacently arranged, and
  wherein a plurality of the plate shaped routing materials (11, 11A) are laminated so that a plurality of the conductor piece parts (23) are separated from each other and adjacently arranged.

[4] The connection structure of the plate shaped routing material and the electric connection box according to the above-described [3],
  wherein a pair of the guide grooves (33) are respectively formed on a pair of the side walls (29) which are parallel along the inserting direction in the electric connection box (13), and
  wherein a pair of the conductor cut-out edge parts (35) in any one of a plurality of the plate shaped routing materials (11) which are laminated, are configured to be respectively inserted into the the pair of the guide grooves (33).

[5] The connection structure of the plate shaped routing material and the electric connection box according to the above-described [3],
  wherein a pair of the guide grooves (33) are respectively formed on a pair of the side walls (71, 75) which are parallel along the inserting direction in the electric connection box (13), and
  wherein a plurality of the conductor cut-out edge parts (35) of two different plate shaped routing materials (11A) of a plurality of the plate shaped routing materials (11A) which are laminated, are configured to be respectively inserted into the pair of the guide grooves (33).

[6] The connection structure of the plate shaped routing material and the electric connection box according to the above-described [5],
  wherein the two different plate shaped routing materials (11A) including the plurality of the conductor cut-out edge parts (35) are laminated so that the plurality of the conductor cut-out piece parts (23) are adjacent to the plurality of the conductor piece parts (35).

DESCRIPTION OF REFERENCE NUMERALS AND SIGNS

11 . . . plate shaped routing material
13 . . . electric connection box
15 . . . connection mechanism
17 . . . flat shaped conductor
19 . . . insulating coating
21 . . . long side part
23 . . . conductor piece part
25 . . . connecting cut-out part
27 . . . mate side conductor piece part
29 . . . side wall
31 . . . cut-out edge part
33 . . . guide groove
35 . . . conductor cut-out part

What is claimed is:
1. A connection structure of a plate shaped routing material and an electric connection box, the connection structure comprising:
  a plate shaped routing material,
  an electric connection box, and
  a connection mechanism,
  wherein the plate shaped routing material includes a belt like flat shaped conductor in which an outer surface is covered with an insulating coating, a connecting cut-out part in which a part of an edge part in one long side part is removed in a rectangular shape, a conductor piece part exposed from the insulating coating in the connecting cut-out part, and a cut-out edge part, wherein the electric connection box includes a mate side conductor piece part electrically connectable to the conductor piece part, a side wall along an inserting direction into the connecting cut-out part, and a guide groove formed on the side wall in which the cut-out edge part is configured to be inserted, wherein the electric connection box is configured to be inserted into the connecting cut-out part, and wherein the connection mechanism electrically conducts and connects the conductor piece part to the mate side conductor piece part.

2. The connection structure of the plate shaped routing material and the electric connection box according to claim 1, wherein the cut-out edge part is a conductor cut-out edge part in which the insulating coating is removed.

3. The connection structure of the plate shaped routing material and the electric connection box according to claim 2, wherein the electric connection box includes a plurality of the mate side conductor piece parts separated from each other and adjacently arranged, and wherein a plurality of the plate shaped routing materials are laminated so that a plurality of the conductor piece parts are separated from each other and adjacently arranged.

4. The connection structure of the plate shaped routing material and the electric connection box according to claim 3, wherein a pair of the guide grooves are respectively formed on a pair of the side walls which are parallel along the inserting direction in the electric connection box, and wherein a pair of the conductor cut-out edge parts in any one of a plurality of the plate shaped routing materials which are laminated, are configured to be respectively inserted into the the pair of the guide grooves.

5. The connection structure of the plate shaped routing material and the electric connection box according to claim 3, wherein a pair of the guide grooves are respectively formed on a pair of the side walls which are parallel along the inserting direction in the electric connection box, and wherein a plurality of the conductor cut-out edge parts of two different plate shaped routing materials of a plurality of the plate shaped routing materials which are laminated, are configured to be respectively inserted into the pair of the guide grooves.

6. The connection structure of the plate shaped routing material and the electric connection box according to claim 5, wherein the two different plate shaped routing materials including the plurality of the conductor cut-out edge parts are laminated so that the plurality of the conductor cut-out piece parts are adjacent to the plurality of the conductor piece parts.

* * * * *